US009817165B2

(12) United States Patent
Mirell et al.

(10) Patent No.: US 9,817,165 B2
(45) Date of Patent: Nov. 14, 2017

(54) CASCADE METHOD AND APPARATUS FOR GENERATING INCREASED DUALITY MODULATION OF ELECTROMAGNETIC RADIATION

(71) Applicants: Stuart Gary Mirell, Los Angeles, CA (US); Daniel Joseph Mirell, Irvine, CA (US)

(72) Inventors: Stuart Gary Mirell, Los Angeles, CA (US); Daniel Joseph Mirell, Irvine, CA (US)

(*) Notice: Subject to any disclaimer, the term of this patent is extended or adjusted under 35 U.S.C. 154(b) by 69 days.

(21) Appl. No.: 14/217,239

(22) Filed: Mar. 17, 2014

(65) Prior Publication Data

US 2014/0300968 A1    Oct. 9, 2014

Related U.S. Application Data

(60) Provisional application No. 61/798,967, filed on Mar. 15, 2013.

(51) Int. Cl.
  *G02B 5/18*    (2006.01)
  *G02B 27/42*   (2006.01)
(52) U.S. Cl.
  CPC ......... *G02B 5/1861* (2013.01); *G02B 5/1866* (2013.01); *G02B 27/42* (2013.01)

(58) Field of Classification Search
  CPC ...... G02B 5/18; G02B 5/1809; G02B 5/1814; G02B 5/1828; G02B 5/1833; G02B 5/1861; G02B 5/1866; G02B 5/1876
  USPC ....... 359/558, 566, 568, 569, 571, 572, 574, 359/575, 576, 618, 619, 620, 621, 622, 359/625, 627; 398/82–84, 87, 201, 202, 398/212; 385/37
  See application file for complete search history.

(56) References Cited

U.S. PATENT DOCUMENTS

| | | | | |
|---|---|---|---|---|
| 6,804,470 B1* | 10/2004 | Mirell | ...................... | G01J 1/08 356/450 |
| 8,081,383 B1* | 12/2011 | Mirell | ...................... | G02F 2/00 359/577 |
| 8,670,181 B1* | 3/2014 | Mirell | .................. | G02B 5/1861 359/566 |
| 2007/0292144 A1* | 12/2007 | Mirell | ...................... | G02F 2/00 398/202 |

* cited by examiner

*Primary Examiner* — Kimberly N Kakalec
(74) *Attorney, Agent, or Firm* — Noel F. Heal (57) ABSTRACT

A method and apparatus for increasing duality modulation of electromagnetic radiation beyond levels achievable by individual duality modulation generators where duality modulation imparts to radiation a disproportion of irradiance and wave intensity. Various techniques are disclosed for configuring a multiplicity of individual duality modulation generators in a cascade such that initially input radiation acquires cumulative increments of duality modulation upon traversing the cascade of individual generators.

8 Claims, 3 Drawing Sheets

CASCADE METHOD AND APPARATUS FOR GENERATING INCREASED DUALITY MODULATION OF ELECTROMAGNETIC RADIATION

CROSS-REFERENCE TO RELATED APPLICATION

This application claims the benefit of Provisional Application No. 61/798,967, filed Mar. 15, 2013, and entitled "Method and Apparatus for Generating Duality Modulated Electromagnetic Radiation," the entirety of which is hereby incorporated by reference into this application.

BACKGROUND OF THE INVENTION

This invention relates generally to techniques for producing an increased disproportion of irradiance relative to wave intensity for mono-energetic coherent electromagnetic radiation. Altering the proportionality of the intrinsic variables irradiance and wave intensity constitutes "duality modulation" since that proportionality is treated as constant under the standard quantum mechanical principle of duality. Equivalently, duality modulation also applies to the integrated values of those intrinsic variables identified respectively as the extrinsic variables energy and probability.

Specifically, the present invention increases duality modulation by teaching techniques for configuring a cascade generator comprised of an appropriately configured sequence of two or more individual duality modulation generator stages. Radiation acquires an added increment of duality modulation as each stage is traversed. The cascade generator produces radiation from a final stage output that has acquired a cumulative duality modulation relative to that of radiation at the first stage input.

Various embodiments of such individual generators are disclosed by the inventors in U.S. Pat. No. 6,804,470 and U.S. Pat. No. 7,262,914. These references disclose a variety of significant applications for duality modulated radiation. The utility of virtually all of these applications would benefit greatly from much higher levels of duality modulation than those achievable in the configurations disclosed in these earlier patents. Accordingly, there is still a need for specific methods and means for achieving these higher levels of duality modulation. The present invention satisfies this need, as further explained in the summary below.

SUMMARY OF THE INVENTION

The present invention uses novel techniques for configuring various embodiments of individual generators as stages in a cascade generator of duality modulated radiation. In essence, the present invention resides in a duality modulation generator comprised of a multiplicity of stages. Each stage consists of an individual duality modulator such as the various examples disclosed by the inventors in U.S. Pat. Nos. 6,804,470, 7,262,914 and 8,670,181. These disclosed examples of individual duality modulation generators are used here, in turn, as examples of stages in a cascade for purposes of illustrative clarity. Nevertheless, it will be appreciated that the present invention teaches novel means and methods for configuring a multiplicity of individual duality modulation generators and these novel means and methods are not restricted to the utilization of the particular examples of individual duality modulation generators included here.

Most generally, an individual duality modulation generator consists of a particular physical component in combination with radiation of particular characteristics and input direction relative to that component. The combination yields an increment of duality modulation on the radiation emergent from the output of the component relative to the radiation at the input. These general requirements for an individual duality modulation generator are equally applicable to each cascade stage in the present invention.

The particular component may utilize various processes to produce duality modulation. For example, the process might broadly be classified as diffraction. The diffraction may result from some specified arrangement of diffraction elements. The examples of such devices given here for illustrative purposes are gratings. The diffraction elements of these particular gratings consist of parallel, periodic linear grating structures configured as a planar array such as those disclosed by the inventors in U.S. Pat. Nos. 6,804,470, 7,262,914 and 8,670,181. Concurrently, for a particular component to produce an increment of duality modulation, the radiation used in combination with the device must enter the input of the device with a particular direction and the radiation must have particular properties of wavelength and polarization.

In a cascade configuration of such devices, the invention teaches novel techniques for providing the requisite direction of radiation derived from a stage output, as that radiation enters a successive stage input. The invention further teaches novel means and methods for compactly and economically utilizing a single component to serve in the capacity as the respective multiplicity of components otherwise associated with a corresponding multiplicity of stages.

The basic functionality of the cascade generator as a means of increasing duality modulation of radiation is deduced from an analysis of the constituent individual generators where planar gratings are used as illustrative examples of the physical components of those individual generators.

In this examination of functionality, it is useful to review certain of the physical properties that characterize beams of radiation. Volumetric integration of irradiance (energy flux density) and intensity (probability flux density) over a representative macroscopic length of an electromagnetic beam $\psi$ yields the inclusive energy E and probability P respectively. The ratio of these quantities $$\Omega = E/P \tag{1}$$

is defined as the "occupation value" of the beam since the ratio specifies the quantity of energy occupying a quantity of probability as described in U.S. Pat. No. 7,262,914. If an initial beam $\psi_{1\text{-}in}$, with an occupation value $$\Omega_{1\text{-}in} = E_{1\text{-}in}/P_{1in}$$

is incident on the input of a single grating $G_1$, the output of that grating typically yields several beams, well known as diffraction orders, which have a total energy $E_{1\text{-}out,T}$ and a total probability $P_{1\text{-}out,T}$ when each is integrated as above.

Because of various conventional losses in traversing the grating, $E_{1\text{-}out,T} < E_{1\text{-}in}$ and $P_{1\text{-}out,T} < P_{1\text{-}in}$. Nevertheless, conventional losses attributable to $G_1$ can be represented by some factor $f_1$ imposed equally on input energy and probability. Then the collective output beams are characterized by $$\Omega_{1\text{-}out,T} = E_{1\text{-}out,T} / P_{1\text{-}out,T} \qquad (2)$$
$$= (f_1 E_{1\text{-}in} / f_1 P_{1\text{-}in})$$
$$= E_{1\text{-}in} / P_{1\text{-}in}$$
$$= \Omega_{1\text{-}in},$$

leaving the total output occupation value unchanged from that of the input if $G_1$ is itself a conventional, non-duality modulating grating.

The occupation values of the individual diffraction orders at the $G_1$ output are of particular interest. By a process of statistical equilibration, the quanta of the output energy, represented by $E_{1\text{-}out,T}$ distribute onto the several output beams, diffraction orders $\psi_{1\text{-}out,i}$, $\psi_{1\text{-}out,j}$, $\psi_{1\text{-}out,k}$, . . . in proportion respectively to the relative probabilities $P_{1\text{-}out,i}$, $P_{1\text{-}out,j}$, $P_{1\text{-}out,k}$, . . . of those beams which have a total probability $P_{1\text{-}out,T} = f_1 P_{1\text{-}in}$. The equilibration process is effectively an application of Born's rule. Then, an arbitrary $j^{th}$ output beam has an energy $$E_{1\text{-}out,j} = E_{1\text{-}out,T}(P_{1\text{-}out,j}/P_{1\text{-}out,T}) \qquad (3)$$

where the ratio $$(P_{1\text{-}out,j}/P_{1\text{-}out,T}) \qquad (4)$$

is recognized as the relative probability of $\psi_{1\text{-}out,j}$. (This ratio is readily determined for a grating by measuring the equivalent ratio of the $\psi_{1\text{-}out,j}$ output beam irradiance and the total irradiance of all of the output beams.) Accordingly, the occupation value of $\psi_{1\text{-}out,j}$ is $$\Omega_{1\text{-}out,j} = E_{1\text{-}out,j} / P_{1\text{-}out,j} \qquad (5)$$
$$= E_{1\text{-}out,T}(P_{1\text{-}out,j}/P_{1\text{-}out,T}) / P_{1\text{-}out,j}$$
$$= E_{1\text{-}out,T} / P_{1\text{-}out,T}$$
$$= \Omega_{1\text{-}out,T}.$$

Equation (5) shows that the occupation value of any single output beam is the same as the occupation of the total output. This equivalence facilitates a simplified notation in which a quantity such as $\Omega_{1\text{-}out}$ suffices to define the occupation value of any single output beam of a $G_1$ grating as well as the occupation value of the total output of that grating.

Nevertheless, since equation (2) shows that input beam and total output occupation values are themselves equal if $G_1$ is an ordinary non-duality modulating grating, equation (5) adds the occupation values of the individual output beams to that equality.

This apparent universal equivalence of occupation values is however disrupted if $G_1$ is either a duality modulating "depletion" or "enrichment" grating as described in U.S. Pat. Nos. 6,804,470, 7,262,914 and U.S. patent application Ser. No. 12/952,075, filed Nov. 22, 2010, where radiation of suitable characteristics and incidence angles is input to that duality modulating $G_1$. An initial beam, with $\Omega_{1\text{-}in} = E_{1\text{-}in}/P_{1\text{-}in}$, directed to the input of that grating will still exhibit some common loss factor $f_1$ for both $E_{1\text{-}in}$ and $P_{1\text{-}in}$ as those quantities reach the grating output. However, for a duality modulating grating $G_1$, interference of probability emergent in the near zone of the grating output alters the resultant output probability by some "probability modulation factor" $\Gamma_1$ associated with $G_1$. $\Gamma_1 > 1$ if, for the specified input radiation, $G_1$ functions as a "depletion" grating and $\Gamma_1 < 1$ if $G_1$ functions as an "enrichment" grating. These modulations of probability can occur because probability is not necessarily a conserved quantity, a condition realized by the outputs of depletion and enrichment gratings. The resultant output probability is $P_{1\text{-}out,T} = f_1 \Gamma_1 P_{1\text{-}in}$. Conversely, energy is a conserved quantity and the emergent output energy $E_{1\text{-}out,T} = f_1 E_0$. The occupation value for the collective output beams is $$\Omega_{1\text{-}out,T} = (f_1 E_{1\text{-}in})/(f_1 \Gamma_1 P_{1\text{-}in}) = \Omega_{1\text{-}in}/\Gamma_1 \qquad (6)$$

This result can be extended to any of the several beams $\psi_{1\text{-}out,i}$, $\psi_{1\text{-}out,j}$, $\psi_{1\text{-}out,k}$, . . . emerging from the output since the probability of all of those individual beams has been modulated by a common factor $\Gamma_1$ at the output of $G_1$ but the relative probabilities, equation (4), of the individual beams are unchanged by $\Gamma_1$. Consequently, equilibration distributes the total output energy in proportion to the relative probabilities independent of $\Gamma_1$ and a $j^{th}$ representative output beam still has an occupation value equal to that of the total output, i.e.

$$\Omega_{1\text{-}out,j} = \Omega_{1\text{-}out,T} = \Omega_{1\text{-}out} \qquad (7)$$

This equivalence was shown in equation (5) where the grating was non-duality modulating. Consequently, whether or not a grating is duality modulating, the total output (over all output beams) and any individual output beam share the same occupation value. This equivalence is further emphasized in equation (7) by the introduced notation for the output occupation value $\Omega_{1\text{-}out}$, which dispenses with the j and T subscript identifiers.

Accordingly, with this simplification, equation (6) appears as $$\Omega_{1\text{-}out} = \Omega_{1\text{-}in}/\Gamma_1. \qquad (8)$$

Equation (8) is an essential expression for increasing duality modulation from individual gratings (or, other component) to cascades of those gratings (or components). In the most elementary cascade, a single beam is incident on the input of a first grating $G_1$. That input beam is appropriately denoted as $\psi_{1\text{-}in}$ and its occupation value is denoted as $\Omega_{1\text{-}in}$. Multiple output (diffraction order) duality modulated beams emerge from $G_1$ which serves as the physical duality modulation component of a first stage. The output beams, each have an occupation value $\Omega_{1\text{-}out}$. In a basic cascade configuration only one of those output beams is utilized and directed to a second stage. That one utilized output beam is designated $\psi_{1\text{-}out}$.

In a basic cascade, the output beam $\psi_{1\text{-}out}$ with an occupation value $\Omega_{1\text{-}out}$ is directed to the input of a sequential second stage, a duality modulation grating component $G_2$. The input beam of the second stage $\psi_{2\text{-}in} = \psi_{1\text{-}out}$ and the occupation value of $\psi_{2\text{-}in}$ at the $G_2$ input is $$\Omega_{2\text{-}in} = \Omega_{1\text{-}out} \qquad (9)$$

Consequently, an output beam of $G_2$ has an occupation value $$\Omega_{2\text{-}out} = \Omega_{2\text{-}in}/\Gamma_2 = \Omega_{1\text{-}out}/\Gamma_2 = \Omega_{1\text{-}in}/\Gamma_2\Gamma_1 \qquad (10)$$

More generally, for any two successive gratings $G_n$ and $G_{(n+1)}$, $$\psi_{n\text{-}out} = \psi_{(n+1)\text{-}in}$$

and $$\Omega_{n\text{-}out} = \Omega_{(n+1)\text{-}in}.$$

From these generalizations and equation (10) it is possible by regression to give an expression for the occupation value of a beam $\psi_{N\text{-}out}$ emerging from the final stage of an arbitrary N stage cascade configuration of duality modulation gratings, $$\Omega_{N\text{-}out} = \Omega_{1\text{-}in}/(\Gamma_N \ldots \Gamma_3 \Gamma_2 \Gamma_1). \tag{11}$$

The collective cascade probability modulating factor of the initial input beam's occupation value is $$\Gamma_c = (\Gamma_N \ldots \Gamma_3 \Gamma_2 \Gamma_1). \tag{12}$$

Clearly, the objective of cascading is to maximize or to minimize the occupation value of the final output beam relative to that of the initial input beam. Consistent with that objective, all of the constituent individual duality modulation generators should respectively be either of the enrichment type or the depletion type. Moreover, in an important particular embodiment of this invention, all of the N generator stages have the same probability modulation factor $\Gamma$ giving $$\Gamma_c = \Gamma^N \tag{13}$$

and $$\Omega_{N\text{-}out} \Omega_{1\text{-}in} \Gamma^{-N} = \Omega_{1\text{-}in} \Gamma_c^{-1}. \tag{14}$$

Equation (14) can generally be further simplified. Electromagnetic radiation beams such as those produced by common emission sources and lasers conventionally have the property that their energy and probability are in some fixed proportion in agreement with the principle of duality. Such beams are said to be "ordinary". In arbitrary unit-less dimensions, energy and probability of an ordinary beam can be set equal giving $$\Omega = E/P = 1. \tag{15}$$

Since ordinary radiation would most likely provide the input radiation for a single stage $G_1$ or for a cascade $G_1$, $G_2, \ldots, G_N$, the occupation value of the initially incident beam can then be set to $\Omega_{1\text{-}in} = 1$. Consequently, for a cascade duality modulation generator comprised of N stages each with the same $\Gamma$, an ordinary beam with $\Omega_{1\text{-}in} = 1$ directed at the cascade initial input gives an occupation value from the $N^{th}$ stage output of $$\Omega_{N\text{-}out} = \Gamma^{-N}. \tag{16}$$

As a matter of reference, it should be noted that any single grating stage, i.e. N=1, is most conveniently characterized by the physical parameter $\Gamma$ of the grating itself. The requisite characterization is measured by using an ordinary beam $\Omega = 1$ at the grating's input. From equation (8), $$\Gamma = \Omega_{out}^{-1} \tag{17}$$

which shows that the inverse of a grating's output beam occupation value gives the value of the grating's $\Gamma$ when $\Omega_{in} = 1$.

It is useful to introduce a formalized definition of duality modulation. An ordinary beam assigned an $\Omega = 1$ provides a convenient reference level for assessing the function of a duality modulation generator whether it is single stage or cascade. If an ordinary beam is input to an enrichment type duality generator, the output occupation value is some $\Omega_{out} > 1$ and the beam is said to be "enriched" when compared to an ordinary beam. Conversely, a beam with $n_{out} < 1$ is said to be depleted. In comparison to an ordinary beam, the enriched beam is higher in energy relative to probability by a factor of $\Omega_{out} > 1$ and the depleted beam is lower in energy relative to probability by a factor of $\Omega_{out} < 1$.

The alternative parameter defined as "duality modulation" DM expresses the deviation of a beam's occupation value from that of an ordinary beam. DM provides a particularly useful alternative to the $\Omega$ characterization of a beam in that DM directly identifies the important figure of merit, the degree to which an output beam's occupation value $\Omega_{out}$ deviates from that of an ordinary beam. The definition of duality modulation $$DM = (\Omega_{out} - 1)100\% \tag{18}$$

is applicable to the output of a single generator $G_1$ where $\Omega_{out} = \Omega_{1\text{-}out}$ as well as to the final output of an N-stage where $\Omega_{out} = \Omega_{N\text{-}out}$. In the latter case, if each stage has the same $\Gamma$, $\Omega_{out} = \Omega_{N\text{-}out} = \Gamma^{-N}$ and $$DM = (\Gamma^{-N} - 1)100\%. \tag{19}$$

In any case if $\Omega_{out} > 1$, the output radiation is enriched and the DM is some positive-valued percentage expressing the percent deviation of $\Omega_{out}$ from a normal beam $\Omega = 1$. Conversely, if $\Omega_{out} < 1$, the output radiation is depleted and the DM is some negative-valued percentage that again expresses the percent deviation of $\Omega_{out}$ from that of a normal beam $\Omega = 1$.

In the context of enrichment of radiation, an increased DM is unambiguously associated with an increased enrichment. However, in the context of depletion of radiation where DM is mathematically a negative quantity, an increased DM is still understood to imply an increased depletion. This convention is appropriate since DM is a measure of the disproportionality of energy and probability relative to that of ordinary radiation. That disproportionality increases as the absolute value of DM becomes larger whether DM itself is positive or negative valued.

BRIEF DESCRIPTION OF THE DRAWINGS

FIG. 4A and FIG. 4B are top view depictions of cascade generators that, in common with FIG. 3A and FIG. 3B, also show input radiation at some finite $\theta$ azimuthal angle. FIG. 4A and FIG. 4B further depict configurations in which a single grating component provides the function of multiple grating components, transmission for FIG. 4A and reflection for FIG. 4B.

FIG. 1 provides the complementary top view showing the nominal normal input of radiation whereas FIG. 5 shows an incremental $\delta\phi$ polar angulation that selectively corrects for reflective disfunction.

DETAILED DESCRIPTION OF THE INVENTION

Figure 1:
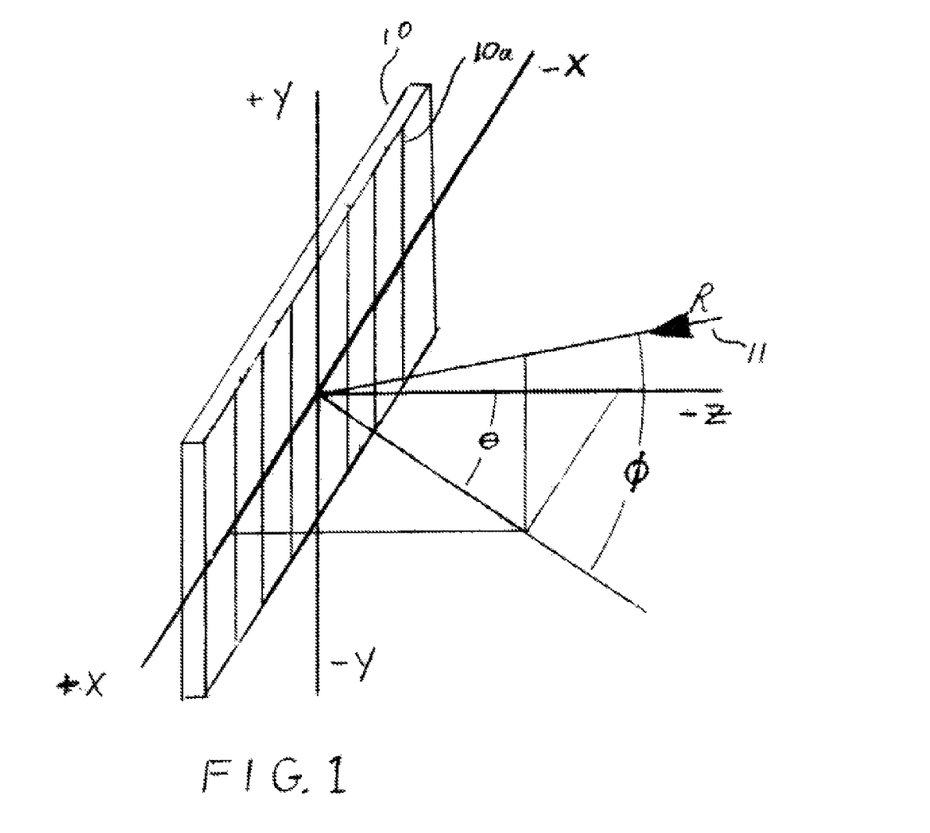
FIG. 1 is a perspective view of a generic single-stage grating, including a parallel array of grating lines, showing an aligned spherical coordinate frame that defines the $\theta$ azimuthal angle and the $\phi$ polar angle of an input radiation vector.

As a prelude to a detailed description of the present cascade generator invention, it is convenient to develop a frame of reference relative to the various constituent stages. FIG. 1 is a perspective view of a generic grating component 10 that together with input radiation, of particular characteristics, along vector R 11 comprise a single stage of a cascade generator. A planar periodic array of parallel linear grating structures commonly referred to simply as grating lines 10a typically is formed on one face of a supportive substrate that constitutes most of the thickness of 10.

The grating 10 shown in FIG. 1 can serve as a representation of a reflection grating or, alternatively, as a representation of a transmission grating. For reflection gratings, the grating input and the grating output share a common face of 10 with the grating lines 10a located on that face. Alternatively, for transmission gratings, the grating input and the grating output are on opposite sides of the grating lines 10a. For transmission gratings, those grating lines 10a can generally be on either face of the substrate if the radiation 11 is separately of appropriate wavelength for either orientation. In FIG. 1, the grating lines 10a are shown on the incidence face of the grating 10 and the near zone of the grating output is located inside the grating 10 substrate. For purposes of duality modulation, the index of refraction $n_1$ of the substrate determines the appropriate wavelength of input radiation 11 since the duality modulating interference that occurs in the near zone is a function of $n_1$.

In addressing the configuration of generator stages in a cascade generator, the particular spherical coordinate frame shown in FIG. 1 is utilized. For any particular embodiment of the present cascade generator invention, the frame is aligned to each constituent stage as shown in FIG. 1. In this alignment, the origin of the frame is positioned in the approximate central region of the grating plane which lies in the x-y plane of the frame. Moreover, one of the centrally located grating lines is coincident with the y axis of the frame.

The vector R 11 depicts the direction of radiation onto the grating input. Relative to the frame aligned to the grating, that vector is incident at the frame's origin at the angles $\phi$ and $\theta$. These angles together uniquely specify the direction of R relative to the spherical coordinate frame and a grating. With the y axis identified as the "pole" axis, $\phi$ is then defined as the "polar angle" and $\theta$ is the corresponding "azimuthal angle". In the FIG. 1 representation of a spherical coordinate frame, $\phi$ differs from the usual convention of measuring the polar angle from the positive pole axis. Nevertheless, the alternative convention used here of measuring the polar angle with respect to the plane normal to the pole is a particular convenience in describing the present invention.

With these designations for the angles $\phi$ and $\theta$, when the radiation along R is at normal incidence to the grating, $\phi$ and $\theta$ are both zero and the input radiation is coincident with the −z axis.

In general for the various embodiments of this invention, at least one of the frame angles $\phi$ and $\theta$ that specify the direction R is zero. Because of this feature, most embodiments of the cascade generator invention can be fully depicted in either simple planar top (x-z plane) or side (y-z plane) view rather than in a three dimensional perspective view.

The radiation directed along R may consist of a single beam as in U.S. Pat. No. 8,670,181, or may consist of a multiplicity of beams as in U.S. Pat. Nos. 6,804,470 and 7,262,914. In the former case, the single beam relative to the coordinate frame is typically linearly polarized orthogonal to the grating line.

Alternatively, in the latter case the multiplicity of beams are typically configured in a regular co-planar array of beams that are mutually convergent on a grating. Adjacent beams in the array are separated by some $2\theta$ azimuthal angle that generates an interference periodicity equivalent to the periodicity of the grating with appropriate relative phasing of the beams. R represents the bisector direction of the co-planar array of beams. Generally for those duality generators utilizing a multiplicity of convergent beams, the bisector direction R for the array of those beams is at an azimuthal angle $\theta$ of zero as in U.S. Pat. Nos. 6,804,470 and 7,262,914. If the multiplicity is an even number, the beams are azimuthally distributed symmetrically on either side of R but no beam actually travels along R. Nevertheless, R does retain the role as the direction of input radiation which in this case is a vector sum over the multiplicity of input beams. For a preferred embodiment in which the multiplicity comprises only two beams, those beams are aligned at ±$\theta$ from R, respectively.

Figure 2:
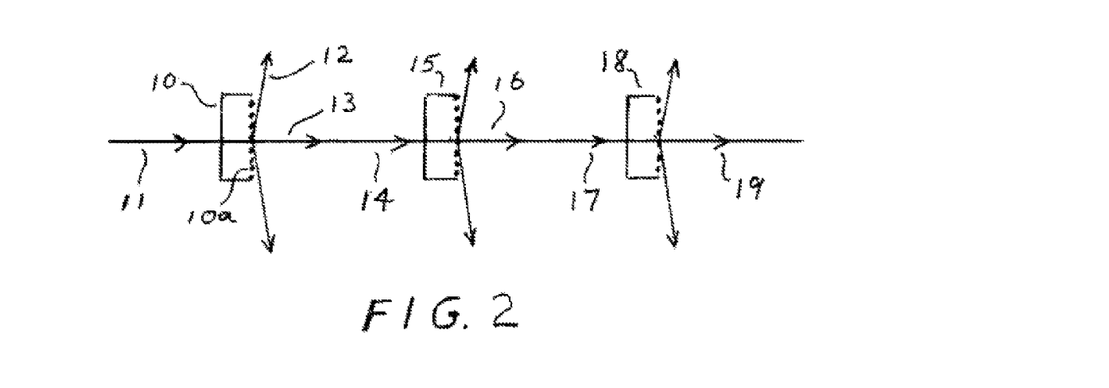
FIG. 2 is a depiction of a cascade generator in top view (x-z plane) comprised of three transmission grating stages with associated input and output beams.

FIG. 2 shows a typical duality modulation cascade generator in a top view. In this example the cascade generator is comprised of three individual duality modulation generator components 10, 15, and 18 that can be identified as $G_1$, $G_2$, and $G_3$ respectively. Each of these individual generators consists of a transmission grating operating nominally with normal incidence of a single beam of input radiation 11 and with the grating lines 10a in this particular case located on the exit face of 10. Transmission gratings such as 10, 15, and 18 generally consist of a square or rectangular substrate plate that is transparent to the particular wavelength of the radiation 11 being utilized. The substrate plate has sufficient thickness to serve as a stable physical support for the planar periodic array of linear grating structures commonly identified as grating lines 10a.

For top views, as in FIG. 2, gratings such as 10 appear on edge with the grating lines 10a and the y axis of the frame in FIG. 1 perpendicular to the x-z plane of the drawing. Those grating lines, which are on end in a top view, are appropriately represented as a co-linear array of dots on one face of the grating. For clarity of depiction only several dots represent the multiplicity of grating lines 10a on 10 but for an actual grating that multiplicity is very large. The grating lines in FIG. 2 are depicted on the exit face of the transmission grating 10 substrate. With an appropriate change in the wavelength of radiation on R 11, the functionality of a transmission grating for duality modulation can be maintained when the grating lines are on the incidence face of the substrate as shown in FIG. 1 where 10 may represent a transmission grating.

FIG. 2 depicts a typical multiplicity of output beams produced at each grating stage. These beams are diffraction orders and they all share the same occupation value. Since the input beam 11 is nominally normal to grating, output beam 13 is commonly identified as the $0^{th}$ order diffraction beam and is collinear with the input beam 11.

In the cascade configuration of FIG. 2, output beam 13 of grating 10 is equivalent to input beam 14 of grating 15 and output beam 16 of grating 15 is equivalent to input beam 17 of grating 18. These equivalences are essential in determining the cumulative duality modulation produced by a cascade.

For an appropriate wavelength of 11, some $n^{th}$ order 12 can be generated near the plane of the grating lines 10a where, as disclosed in U.S. Pat. No. 8,670,181, an increment of depletion duality modulation is produced. Because of the azimuthal symmetry of 11 relative to grating 10, a symmetric $-n^{th}$ mate to 12 is also generated opposite 12 as shown in FIG. 2 thereby doubling the increment of depletion duality modulation produced. Similarly, for a slightly larger wavelength of 11 or slightly smaller grating period of grating 10 as disclosed in application Ser. No. 12/952,075, filed Nov. 22, 2010, the symmetric pair of $\pm n^{th}$ orders are marginally excluded at the plane of the grating lines 10a producing a doubled increment of enrichment duality modulation.

The nominally normal orientation of R 11 where $\theta=0$, is generally advantageous because of the capability for doubling orders near or beyond the plane of the grating lines 10a with consequent doubling of duality modulation. That advantage incurs a technical difficulty since any residual radiation reflected off of the input side of the grating lines 10a is collinear to the input radiation 11 causing reflective interference with 11. Similarly, reflective interference is also present on input radiation 14 for grating 15 and on input radiation 17 for grating 18. These reflective interferences significantly nullify duality modulation present on input radiation at any stage thereby rendering the duality modulation of a final output radiation 19 much less than would be expected from a cascade of gratings 10, 15, and 18. A particular novel feature of the present invention consists of a remedy for the reflective interference that occurs when radiation R is nominally normal to the constituent stages.

Figure 3A:
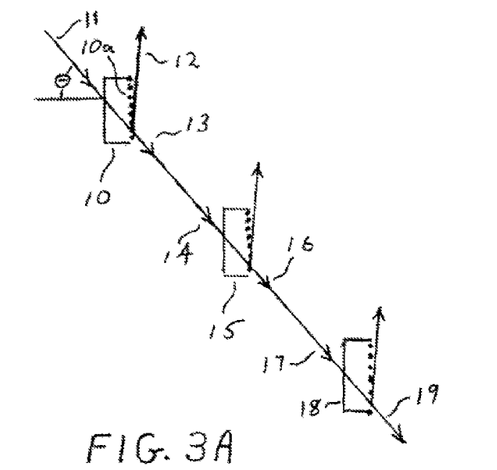
FIG. 3A and FIG. 3B are top view depictions of a cascade generators comprised of three grating stages where the input radiation is at some finite $\theta$ azimuthal angle. Transmission grating stages are shown in FIG. 3A and reflection grating stages are shown in FIG. 3B.
Figure 3B:
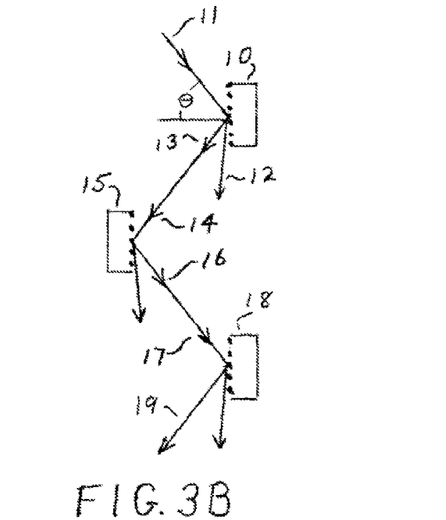

FIG. 3A and FIG. 3B respectively depict cascade configurations for a sequence of transmission gratings and reflection gratings in a top view. Radiation 11 is input at some finite $\theta$ on the first stage 10 and, by symmetry, radiation is input at that same $\theta$ on subsequent stages 15 and 18. The polar angle $\phi=0$. The ability of each constituent stage to generate an increment of duality modulation is derived from the condition of generating a diffraction order near or just beyond the constituent grating planes. In these figures, a diffraction order 12 on grating 10 satisfies the first condition. By symmetry of the cascade configuration, analogous orders are generated at gratings 15 and 18.

The grating structures may be symmetric about $\pm x$ which produces azimuthal symmetry of a grating comprised of such structures. Conversely, grating structures may be asymmetric about $\pm x$ which produces azimuthal asymmetry for those gratings. Gratings known in the art as blaze gratings exhibit this azimuthal asymmetry. In a cascade configuration such as that depicted in FIG. 3B gratings 10, 15, and 18 could be identical blaze gratings with radiation input at some azimuthal $\theta$ on each of the gratings. In such a case, it may be necessary to rotate certain of those gratings by 180° about the particular coordinate frame z axis for those gratings in order to provide radiation input similarly to all gratings.

Figure 4A:
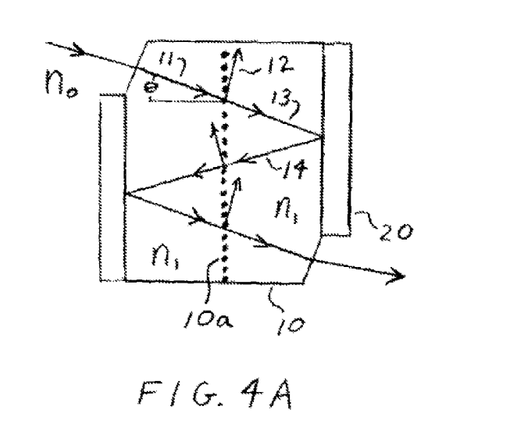
Figure 4B:
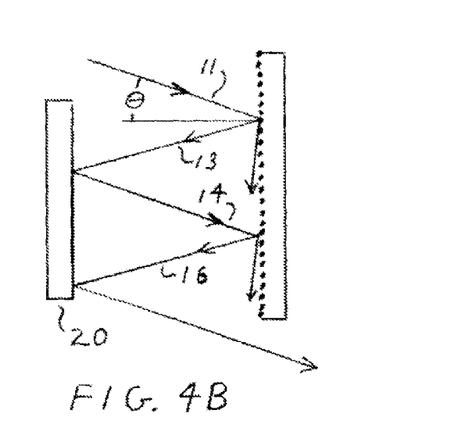

The top views FIG. 4A and FIG. 4B depict a particular novel feature of the cascade generator invention in which a single grating provides the function of multiple stages of the cascade. These two figures are respectively analogous to the preceding FIG. 3A and FIG. 3B in the respect that radiation at each stage is input at some finite azimuthal angle $\theta$ and at a polar angle $\phi=0$.

FIG. 4A shows the embodiment of this novel feature for the transmission grating 10 with grating lines 10a sandwiched between a pair of transmissive substrate plates of 10. A mirror 20 reflects output radiation 13 back to grating lines 10a as input radiation 14 thereby comprising a second stage. The process is repeated again with an opposed mirror. Both substrate plates physically support the grating lines 10a and both have a common index of refraction $n_1$ thereby giving the transmission grating 10 the property of bi-directionality of function for duality modulation. The process of duality modulation is critically dependent on the wavelength of radiation in the near zone of the grating output. If a transmission grating is to have bi-directionality of duality modulation, there must be equivalence of the refraction index on both sides of the grating lines 10a.

Alternatively, the grating lines 10a in FIG. 4A may be physically self-supporting. This may be feasible for microwave wavelengths where the grating lines may be a periodic planar array of linear grating structures such as rods that do not require a physical substrate support directly juxtaposed on the plane of the array. In such a case, the substrate of the grating 10 may be omitted and the index of refraction $n_1$ is the same as the index of refraction $n_0=1$ external to the grating 10.

FIG. 4B shows the reflection grating analog of the transmission grating cascade configuration shown in FIG. 4A in which a single grating serves the function of multiple stages of a cascade generator and where at each stage radiation is input at some finite azimuthal angle $\theta$ and at a polar angle $\phi=0$. A single mirror 20 repeatedly redirects output radiation back to the grating lines 10a.

Figure 5:
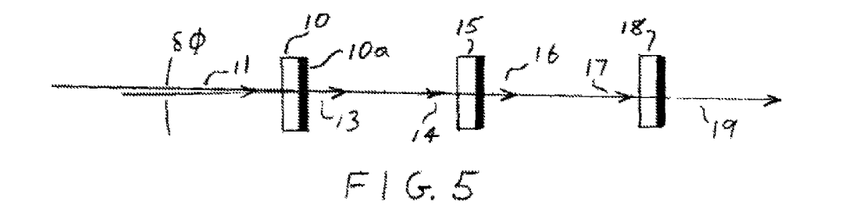
FIG. 5 is a side view (y-z plane) depiction of a three stage cascade using transmission gratings.

FIG. 5 shows a side view (y-z plane) of the cascade generator shown as a top view (x-z plane) in FIG. 2. In this side view, a bold vertical line represents the edge view of one of the grating lines 10a on grating 10. The top view of FIG. 2 shows radiation R is nominally normal to the constituent stages which is advantageous because that orientation provides for a doubling of orders near or just beyond the plane of the grating lines 10a and a resultant doubling of the increment of duality modulation. However, reflective interference, which occurs when radiation R is nominally normal to the constituent stages, significantly diminishes the increment of duality modulation generated by each of those stages.

A remedy for this reflective interference constitutes a particular novel feature of the present invention. This remedy is shown in FIG. 5 and consists of an incremental $\delta\phi$ polar angle departure of radiation from a nominally normal input of 11. With input radiation at this $\delta\phi$ polar angle, reflected radiation from grating lines 10a occurs at a polar angle $-\delta\phi$ and is not collinear to the input radiation for grating 10 as well as for the gratings at successive stages. This remedy maintains the FIG. 2 azimuthal symmetry of input radiation and permits a doubling of diffraction orders near or just beyond the plane of the grating lines 10a thereby giving a concurrent doubling of the increment of duality modulation generated by one of those diffraction orders. It may be appreciated that, while examples are known in the art where an incremental $\delta$ angulation is introduced in order to remove reflective interference, the necessity of restricting that angulation to a polar $\delta\phi$, is a non-obvious remedy unique to maintaining functionality of duality modulation.

Figure 6A:
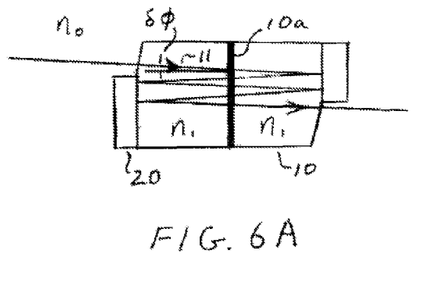
FIG. 6A and FIG. 6B are side view depictions of cascade generators for which input radiation is nominally normal and a single grating component provides the function of multiple grating components, transmission for FIG. 6A and reflection for FIG. 6B. An incremental $\delta\phi$ polar angulation selectively corrects for reflective disfunction.
Figure 6B:
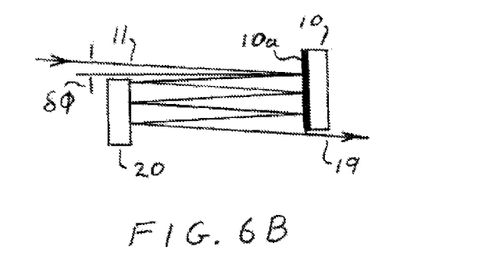

FIG. 6A and FIG. 6B are side view depictions of cascade configurations that embody the particular novel feature of a single grating providing the function of multiple gratings as well as the particular novel feature of an incremental polar angle δϕ providing a remedy for reflective interference associated with nominally normal input radiation. FIG. 6A shows a transmission grating analogous to that of FIG. 4A. FIG. 6B shows a reflection grating analogous to that of FIG. 4B.

Figure 7:
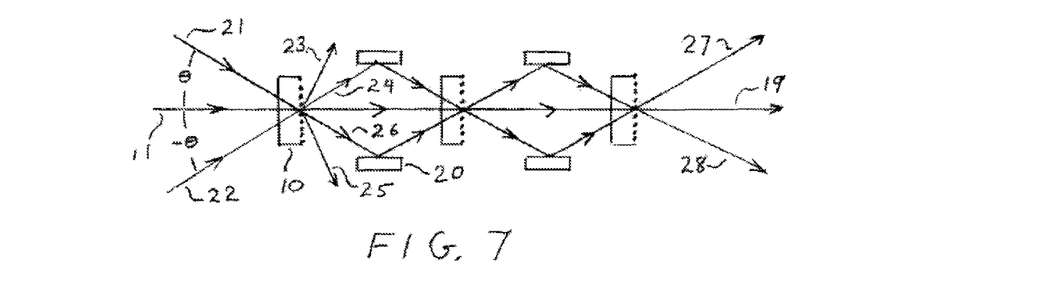
FIG. 7 shows a multiplicity of two input radiation beams on a cascade of generator stages in top view utilizing transmission gratings with minors intermediate to the stages redirecting radiation back to a successive stage.

FIG. 7 is a top view of a cascade generator with stages consisting of duality modulating generators as described in U.S. Pat. Nos. 6,804,470 and 7,262,914. These duality modulating generators utilize a multiplicity of input beams. The particular embodiment of the generators shown in FIG. 7 are transmission gratings that utilize two similar, mutually coherent input beams 21 and 22, respectively at +θ and −θ. The vector sum of these two beams is represented by 11, which then correctly represents the net direction of input radiation even though neither input beam is collinear to 11. That net direction 11 is nominally normal to grating 10. First stage output beams such as 23, 24, 25, and 26 are all equally duality modulated by 10. Two of these beams 24 and 26 are convergently redirected by mirrors such as 20 to a consecutive grating. This process is repeated again and provides final output beams 27 and 28 defined by a net direction 19 for final output radiation.

The actual input radiation beams in FIG. 7 that converge pair-wise on the various grating stages are not normal to the plane of the grating lines. Consequently, no input beam incurs reflective interference from itself. However, because of symmetry, each member of an input pair reflects back into the input path of the other member causing reflective interference for both input beams. That reflective interference diminishes the duality modulation of those input beams and diminishes the cumulative duality modulation of a cascade of such individual duality modulation generators. Accordingly, the novel remedy for reflective interference of including an incremental polar angulation δϕ of the input radiation is applicable to the cascade generator depicted in FIG. 7.

Figure 8A:
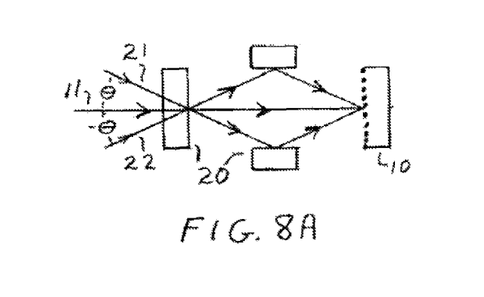
FIG. 8A and FIG. 8B are respectively the top and side views of a multiplicity of two input beams on a cascade generator in which a single reflection grating component provides the function of multiple grating components, and mirrors repeatedly redirect radiation back to that grating component.
Figure 8B:
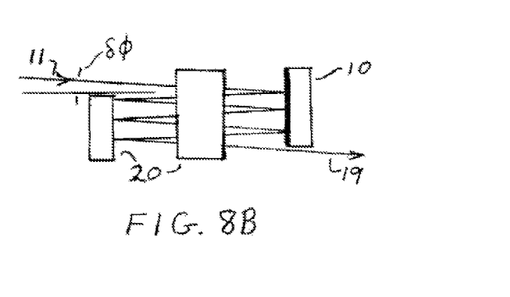

FIG. 8A and FIG. 8B are respectively a top and a side view of a cascade generator that also utilizes the multiple input beam duality modulation generators disclosed in U.S. Pat. Nos. 6,804,470 and 7,262,914. The cascade generator depicted in these figures uses a reflection grating. Moreover, that single reflection grating provides the function of multiple gratings. Mirrors such as 20 provide repeated pair-wise return of grating 10 output beams back to grating 10 as convergent input beams. The top view FIG. 8A shows the initial input of beams 21 and 22 where 11 designates the net vector direction of that initial input radiation. The side view FIG. 8B illustrates the path of that initial input radiation 11 as well as the progressive path of radiation encountering three stages of duality modulation before exiting as output radiation 19.

It will be appreciated from the foregoing that the present invention teaches techniques for increasing duality modulation of radiation by methods and means of cascading individual duality modulation generators. Particular examples of planar linear-array grating components are given for purposes of illustrating examples of individual duality modulation generator stages. However, within the spirit and scope of the invention, the cascade methods and means disclosed here are not restricted to duality modulation generators incorporating planar linear-array gratings as physical components of those individual duality modulation generators. Accordingly, the invention should not be limited except as by the appended claims.

The invention claimed is:

1. A cascade generator for producing increased duality modulation of a single radiation beam, the cascade generator comprising:
   a multiplicity of individual duality modulating generator stages in a cascade configuration of successive stages, including at least a first stage and a final stage;
   wherein each stage includes a physical component having a stage input to which a single input radiation beam is selectively directed and a stage output from which a single radiation beam with an incrementally greater level of duality modulation is emitted;
   wherein a single output radiation beam from each successive stage except the final stage is coupled to the input of the next successive stage; and
   wherein selectively directed radiation at the first stage input of the cascade acquires an additional increment of duality modulation as that radiation transits each successive stage, whereby radiation from the output of a final stage has acquired a multiplicity of increments of duality modulation.

2. A cascade generator for producing increased duality modulation of radiation, comprising:
   a multiplicity of individual duality modulating generator stages in a cascade configuration of successive stages;
   wherein each stage includes a physical component having a stage input to which input radiation is selectively directed and a stage output from which radiation with an incrementally greater level of duality modulation is emitted;
   wherein output radiation from each successive stage is coupled to the input of the next successive stage;
   wherein selectively directed radiation at a first stage input of the cascade acquires an additional increment of duality modulation as that radiation transits each successive stage, whereby radiation from the output of a final stage acquires a multiplicity of increments of duality modulation; and
   wherein the physical component of a single duality modulation generator provides the function of a multiplicity of such physical components by repeated redirection of radiation from the output of the single physical component back to the input of that physical component.

3. A cascade generator for producing increased duality modulation of radiation, comprising:
   a multiplicity of individual duality modulating generator stages in a cascade configuration of successive stages;
   wherein each stage includes a physical component having a stage input to which input radiation is selectively directed and a stage output from which radiation with an incrementally greater level of duality modulation is emitted;
   wherein output radiation from each successive stage is coupled to the input of the next successive stage;
   wherein selectively directed radiation at a first stage input of the cascade acquires an additional increment of duality modulation as that radiation transits each successive stage, whereby radiation from the output of a final stage acquires a multiplicity of increments of duality modulation; and
   wherein the functionality of individual stages to produce duality modulated radiation is adversely diminished by reflective interference of input radiation with collinearly reflected radiation from that stage; and whereby that reflective interference is remedied by a selective incremental angulation of input radiation that eliminates collinearly reflected radiation while preserving the duality modulation of the individual stages.

4. A cascade generator for producing increased duality modulation of radiation comprising:
- a radiation source providing a single mono-energetic coherent input beam having a selected wavelength; and
- a plurality of successive stages of generators of duality modulated radiation connected in a cascade relationship, including at least a first stage and a last stage;
- wherein each successive stage includes a diffractive grating having a selected periodicity and structure and that grating being positioned to receive an input beam at a selected angle of incidence;
- wherein the generator has critical parameters of beam wavelength, diffractive grating periodicity and angle of incidence that are selected to produce at least one duality modulated output beam from the diffractive grating; and
- wherein the single mono-energetic coherent input beam provides an input to the first of the successive stages, and each successive stage except the last generates an output beam that provides an input to the next successive stage.

5. A cascade generator as defined in claim 4, wherein the diffractive grating in each successive stage is a transmission grating.

6. A cascade generator as defined in claim 4, wherein the diffractive grating in each successive stage is a reflective grating.

7. A cascade generator as defined in claim 4, wherein the diffractive gratings of the plurality of successive stages are together embodied in a single physical grating structure shared by the successive stages.

8. A cascade generator as defined in claim 7, and further comprising at least one mirror, from which an output beam from each successive stage except the last is reflected as an input beam to the next successive stage.

* * * * *